United States Patent [19]

Zander et al.

[11] Patent Number: 5,225,961
[45] Date of Patent: Jul. 6, 1993

[54] LOW VOLTAGE CONNECTOR FOR A POWER BOX

[75] Inventors: Jeffrey E. Zander, Saint Louis Park; Jay J. Kakuk, Plymouth; Michael J. Gergen, Mound; Kevin B. Wittman, Brooklyn Park, all of Minn.

[73] Assignee: The Toro Company, Minneapolis, Minn.

[21] Appl. No.: 971,367

[22] Filed: Nov. 4, 1992

Related U.S. Application Data

[62] Division of Ser. No. 654,870, Feb. 13, 1991.

[51] Int. Cl.$^5$ .............................. H02B 1/26
[52] U.S. Cl. .................... 361/356; 361/331; 361/399; 361/415; 361/426; 174/50; 174/52.1
[58] Field of Search ............... 361/392, 394, 395, 399, 361/426, 427, 428, 415, 356, 331, 332, 334; 174/50, 50.51, 52.1, 54, 61

[56] References Cited

U.S. PATENT DOCUMENTS

| | | | |
|---|---|---|---|
| 4,144,555 | 3/1979 | McGalliard | 361/386 |
| 4,222,089 | 9/1980 | MacAskill, Jr. et al. | 361/263 |
| 4,393,435 | 7/1983 | Petrina | 361/377 |
| 4,445,737 | 5/1984 | Long et al. | 339/18 C |
| 4,861,273 | 8/1989 | Wenman et al. | 439/111 |
| 4,920,301 | 4/1990 | Crooks | 315/241 |
| 5,041,950 | 8/1991 | Tyson | 362/96 |

Primary Examiner—Leo P. Picard
Assistant Examiner—Young S. Whang
Attorney, Agent, or Firm—R. Lawrence Buckley

[57] ABSTRACT

A Power box (12) for a low voltage lighting system (10). Power box (12), which connects to a 120 VAC source via 120 VAC cable (15) and a plurality of low voltage light fixtures (14) via a 12 VAC cable (16), includes a "tortuous path" strain relief (40) including a first strain relief structure (41) in a base (19) having vertically spaced horizontal ribs (44, 46, 48) and a second strain relief structure (43) in a cover (28) having corresponding vertically spaced horizontal ribs (56, 54, 52). When base (19) and cover (28) are assembled, structures (41 and 43) align such that the ribs interdigitate or mesh to form the tortuous path strain relief (40) for the 120 VAC cable (15). Another aspect of the invention is the use of a standard spade lug connector (77) and a pair of "double-L" spade lug connectors (78) for making the internal and external 12 VAC connections to a step down transformer (60) and the 12 VAC cable (16), respectively. Another aspect of the present invention is a power box mounting system which includes a horizontal groove (90) on the rear wall (27) of power box (12), and a vertical slot (94) extending upwardly from groove (90) and also formed in the rear wall (27). Groove (90) and slot (94) are configured to receive a power box mounting screw (92), in that order. Still another aspect of the present invention resides in the fact that the base (19) and cover (28) of power box (12) can accommodate a variety of electrical components, including either a 36 watt transformer (60') or a 72 watt transformer (60").

2 Claims, 11 Drawing Sheets

LOW VOLTAGE CONNECTOR FOR A POWER BOX

This is a division of application Ser. No. 07/654,870, filed Feb. 13, 1992.

TECHNICAL FIELD

The present invention relates generally to power packs or power boxes for low voltage systems. More particularly, this invention relates to power boxes for low voltage lighting systems.

BACKGROUND OF THE INVENTION

Low voltage lighting systems are well known. Such a system typically includes a power pack or power box which is connected to a 120 VAC source, and a plurality of low voltage (typically 12 VAC) light fixtures connected to the power box via insulated cable. The present invention relates specifically to such power boxes.

The typical low voltage lighting system power box includes a variety of electrical components, e.g., 120 VAC/12 VAC step down transformer, relay, one or more switches, and a photoelectric element, depending on the complexity of the system. The Toro Company, assignee herein, manufactures power boxes of various types and complexity, including those which simply include an on/off switch; those which include a photoelectric element and which turn the lights on at dusk and off at dawn; and those which include a photoelectric cell and a solid state timer which combine to turn the lights on at dusk and off after four or eight hours, as selected. A typical prior art power box base 190 is shown in FIG. 10. The cover is not shown. Base 190 contains a step down transformer 192; a PC board 194 connected to transformer 192; a photocell 196 carried by PC board 194; and a window 197 for photocell 196. A 120 VAC cable 204 and a 12 VAC cable 210 connect to and power the components listed above.

While numerous improvements have been made to low voltage light fixtures to render them more adjustable, less costly, etc., low voltage power boxes have received much less attention. One of the problems with prior low voltage power boxes is the method by which the 120 VAC and 12 VAC cables are connected to the box. A common way to attach the 120 VAC cable to the power box is through the use of a "tortuous path" strain relief. For the present purposes, a "strain relief" is defined as means for connecting an electrical cable to an electrical device in such a way that the mechanical load on the cable is borne primarily if not exclusively by the insulation or sheathing of the cable rather than by the conductors therein. Referring to FIG. 9 herein, the typical 120 VAC tortuous path strain relief 198a in previous power boxes includes a series of spaced pegs 200a extending from one of the walls 202 of the power box base 201 or cover. During assembly of the power box the 120 VAC cable 204 is woven through and around the pets 200a, and the conductors 206 within the 120 VAC cable 204 are connected to the primary coil of the step down transformer (not shown). The cable exits through an aperture 208 in one of the walls of the power box and terminates with a standard 120 VAC plug (not shown). Such a strain relief system usually passes the Underwriter's Laboratory (UL) cable pull test, which involves hanging a 35 pound weight from the 120 VAC cable 204 for one minute, but is less than ideal because it is so difficult and time consuming to weave the fairly stiff, 120 VAC cable 204 through and around the strain relief pegs 200a.

As to the 12 VAC cable-to-power box connection, some prior power boxes have the 12 VAC cable preassembled with the power box at the factory, but this means that the entire power box/cable assembly has to be replaced or serviced if only the box or the cable is defective. Also, preassembling the 12 VAC cable to electrical components within the power box involves additional assembly steps which increase the cost of the unit. A prior art 12 VAC tortuous path strain relief 198b, with 12 VAC cable 210 woven to-and-fro through strain relief pegs 200b, is shown in FIG. 9. Other prior power boxes include terminal blocks (metal blocks which are female threaded to receive clamping screws) for the external 12 VAC connections. Terminal blocks are inconvenient and fairly costly, however.

Another problem with previous low voltage lighting system power boxes is that they are unnecessarily difficult to mount on a wall or other vertical surface near a 120 VAC outlet. Referring to FIGS. 9-11 herein, the typical existing mounting system includes a fairly small aperture 212 in the rear wall 202 (or an extension 214 thereof) of the power box with a short vertical slot 216 extending upwardly therefrom. The diameter of the aperture 212 is sized to be slightly larger than the head of a typical mounting screw and the width of the vertical slot 216 is sized to be slightly larger than the shank of the mounting screw but smaller than the head of the screw. Thus to hang the power box on the screw it is necessary to (i) vertically and horizontally align the aperture 212 in the rear wall of the power box with the head of the mounting screw; (ii) push the power box rearwardly so that the screw is received by the aperture; and (iii) release the power box so that the shank of the screw enters the vertical slot 216. Again, the problem with such a system lies in the initial alignment of the fairly small mounting aperture 212 (in the rear wall of the power box) with the mounting screw. Some power boxes, particularly those containing larger transformers, are quite heavy and it is inconvenient to try to achieve such an alignment while at the same supporting the heavy power box.

Still another problem with previous power boxes, more specifically the packaging (bases and covers) thereof, is that they are limited in terms of the electrical components, functions and lighting systems they can accommodate. For example, The Toro Company, assignee herein, previously had one base/cover combination for a 72 watt transformer (one suitable for powering 10 lights, each having a 7 watt bulb), with a manual switch; a second base/cover combination for a 72 watt transformer with a 4 hour/8 hour switch; and a third base/cover combination for a 118 watt transformer (for powering 16 lights, each having a 7 watt bulb) with a 4 hour/8 hour switch. There thus had to be a unique injection molding tool (or tool modification) for each unique base or cover. Also, the various bases and covers had to be carefully and separately inventoried to prevent problems on the assembly line.

The present invention addresses the aforementioned problems with previous power boxes. In particular, the present invention includes a power box having a superior tortuous path strain relief for the 120 VAC cable; a cost effective, easy-to-use method for achieving the 12 VAC connections; an improved technique for hanging the power box from a mounting screw or the like; and standardized packaging (base and cover) for accommodating a variety of electrical components, functions and lighting systems.

SUMMARY OF THE INVENTION

Accordingly, one aspect of the invention resides in a power box assembly for a low voltage lighting system, including a 120 VAC cable; a power box including a base and a cover for same; and "strain relief means" for securing the 120 VAC cable to the power box. The "strain relief means" includes a first plurality of spaced strain relief elements connected to the power box base, and a second plurality of spaced strain relief elements connected to the power box cover. When the cover is connected to the base the first and second pluralities of strain relief elements "interdigitate" (mesh) and engage the 120 VAC cable in such a fashion that the 120 VAC cable assumes a tortuous path configuration.

Another aspect of the invention resides in a hanging system for such a power box. The hanging system includes "horizontal groove means" formed in the rear wall of the power box and extending across the entire width of same, for slidably receiving the hanging element; and "slot means" extending upwardly from the horizontal groove and located approximately at the vertical centerline of the power box. In order to hang the power box from a "hanging element" (e.g., mounting screw), it is simply necessary to manipulate the power box until the hanging element is received by the horizontal groove means, and then sliding the power box one way or the other until the hanging element aligns with and falls into the "slot means."

Another aspect of the present invention resides in a pair of "double-L" low voltage connectors operatively connected to a PC board located within a power box. Each "double-L" connector includes a horizontal portion and a pair of horizontally spaced and vertically staggered vertical portions connected thereto. The horizontal portion is parallel to and lies in contact with the substrate of the PC board. One of the vertical connector portions of each "double-L" connector extends downwardly from the horizontal portion thereof and through the bottom 7D&,a1G$L B:vf&N68dYyO r vertical connector portion extends upwardly from the horizontal portion thereof. The free end of one of the upwardly extending vertical connector portions forms a spade lug for ready connection to one of the wires extending from the secondary coil of the 120 VAC/12 VAC step down transformer; and the free ends of the downwardly extending vertical connector portionss form spade lugs for ready connection to the 12 VAC cable which extends to the low voltage light fixtures.

Still another aspect of the present invention relates to a power box base and cover which can accommodate a variety of electrical components including, for example, either a 36 watt or a 72 watt transformer.

DETAILED DESCRIPTION OF PREFERRED EMBODIMENTS

Figure 1:
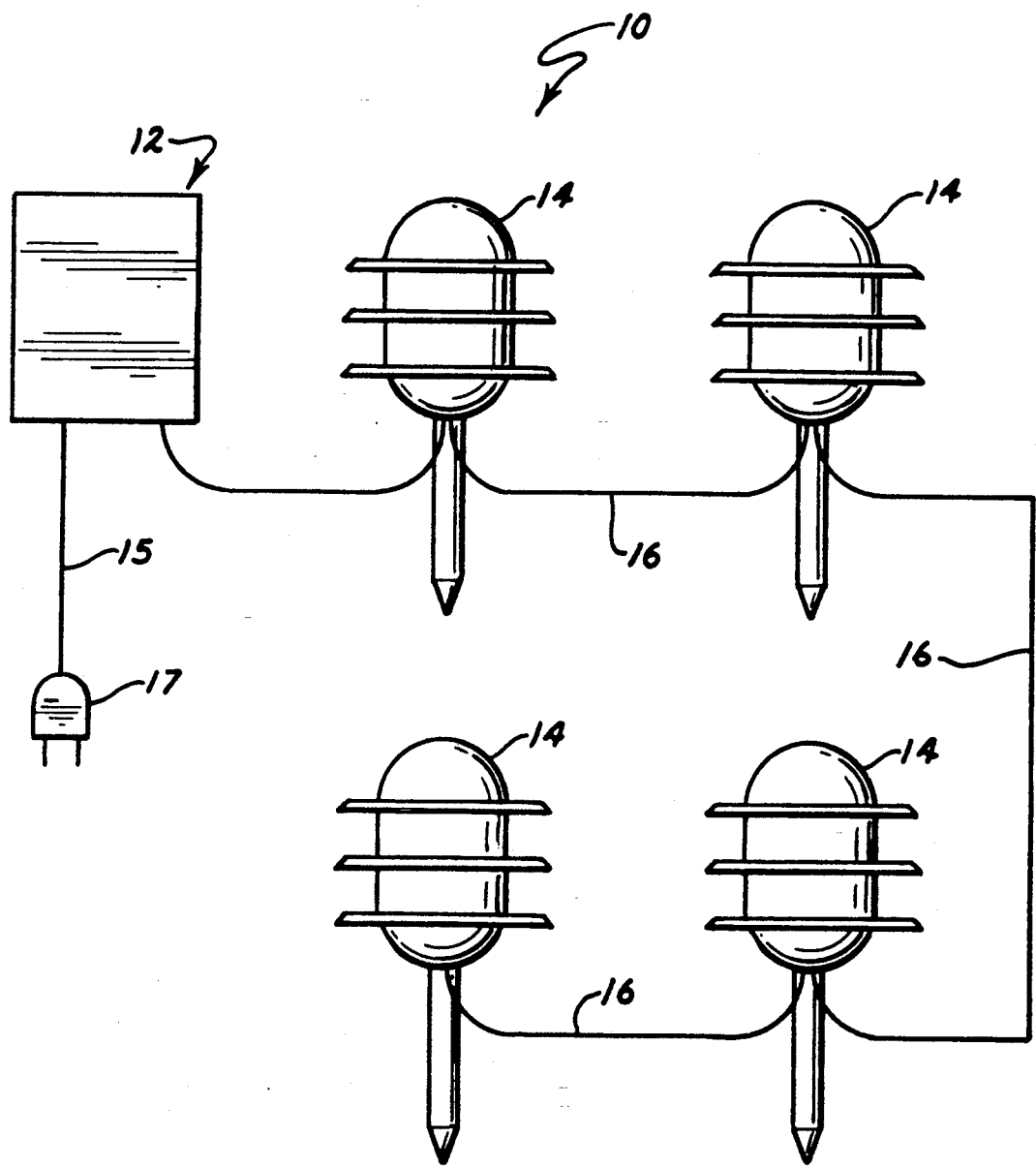
FIG. 1 is a pictorial view of a low voltage lighting system including a power box according the invention.

With reference to the Drawing, wherein like reference numerals designate like parts and assemblies throughout the several views. FIG. 1 shows a pictorial view of a low voltage lighting system 10 according the invention. Lighting system 10 includes a power box 12 which can be connected to a 120 VAC source through the use of a 120 VAC cable 15 and standard 120 VAC plug 17; and connected to a plurality of low voltage light fixtures 14 via 12 VAC cable 16. It should be noted that low voltages other than 12 VAC are contemplated, but 12 VAC alone is discussed herein for the sake of brevity. Inasmuch as the present invention resides primarily in power box 12, the remainder of this discussion will focus on same.

Figure 2:
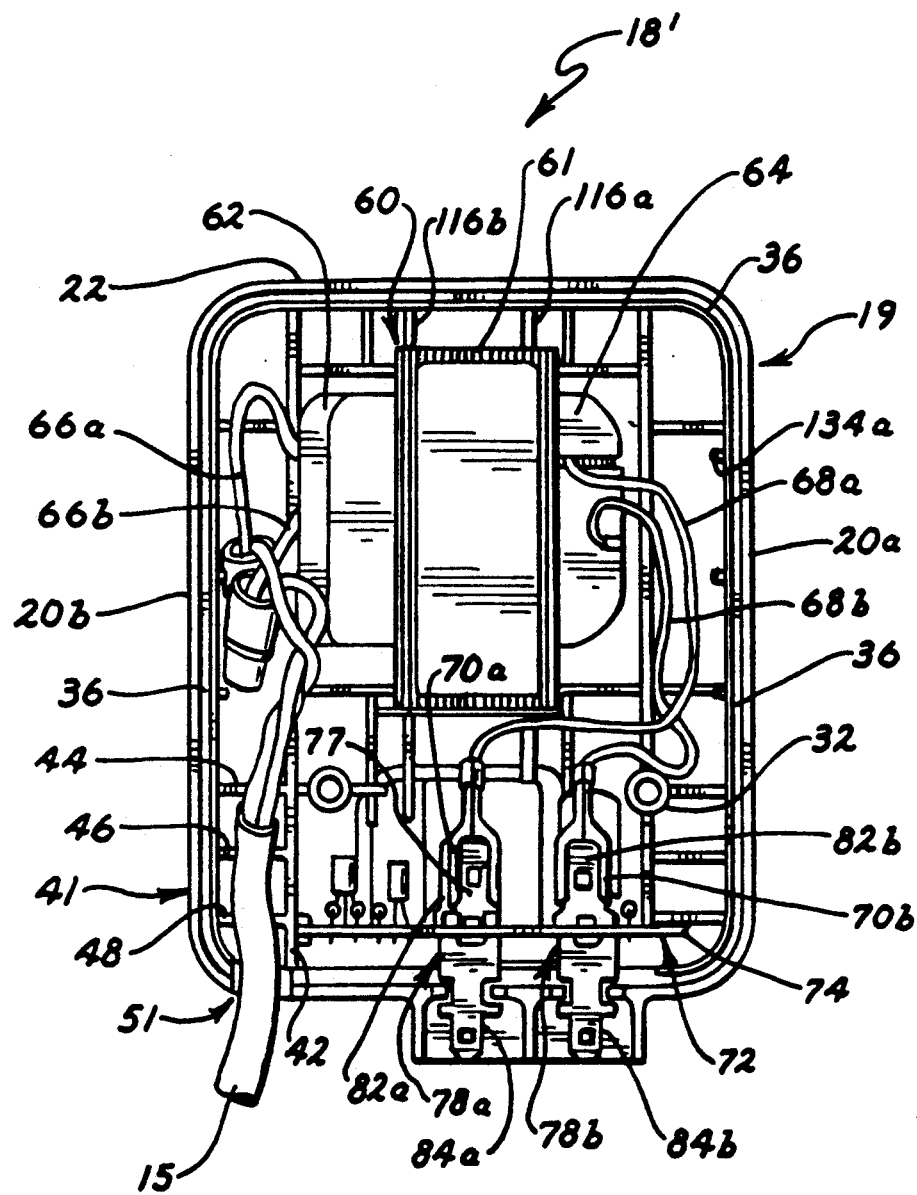
FIG. 2 is a rear elevational view of one embodiment of the power box shown in FIG. 1, with the rear cover removed therefrom.
Figure 3:
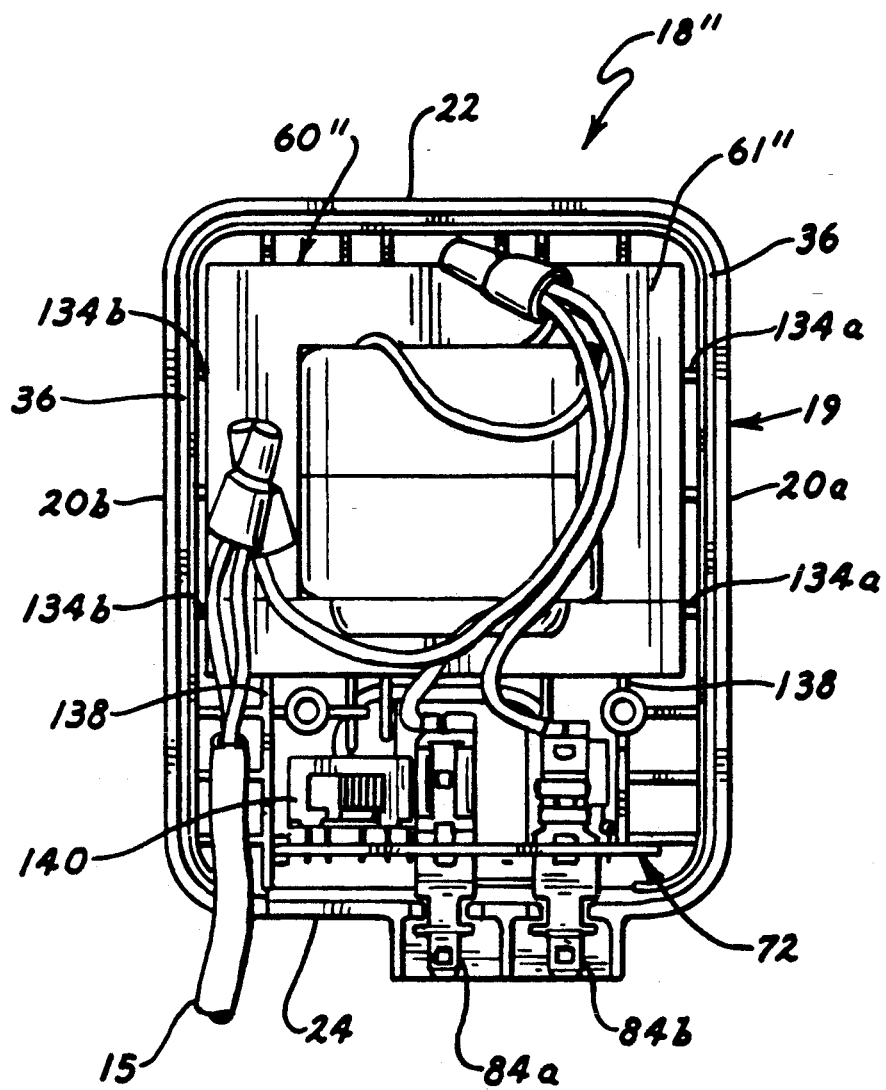
FIG. 3 is a rear elevational view of another embodiment of the power box shown in FIG. 1, with the rear cover removed therefrom.

FIG. 2 shows a rear elevational view of a base assembly 18' of power box 12, with the electrical components in position. FIG. 3 shows a rear elevational view of a base assembly 18" of power box 12, the primary difference between base assemblies 18' and 18" being that base assembly 18' includes a fairly small 120 VAC/12 VAC step down transformer 60' (e.g.. 36 watts) mounted such that the laminated core 61' extends fore-and-aft, whereas base assembly 18" includes a larger 120 VAC/12 VAC step down transformer 60" (e.g.. 72 watts) mounted such that the core 61" extends side-to-side. Henceforth, the "primes" and "double primes" will be dropped for the sake of brevity.

Base assembly 18 is generally rectangular in shape and includes a box-like base 19 having generally vertical right and left side walls 20a and 20b; a generally horizontal top wall 22; a generally horizontal bottom wall 24; and a generally vertical front wall 26. The rear portion of base 19 is open to receive the various electrical components of base assembly 18.

A cover 28 (see FIGS. 4B and 5) is connected to base 19 to completely encase the electrical components therein. Cover 28 is also generally rectangular in shape and includes generally vertical right and left side walls 21a and 21b; a generally horizontal top wall 23; a generally horizontal bottom wall 25; and a generally vertical rear wall 27.

Figure 4A:
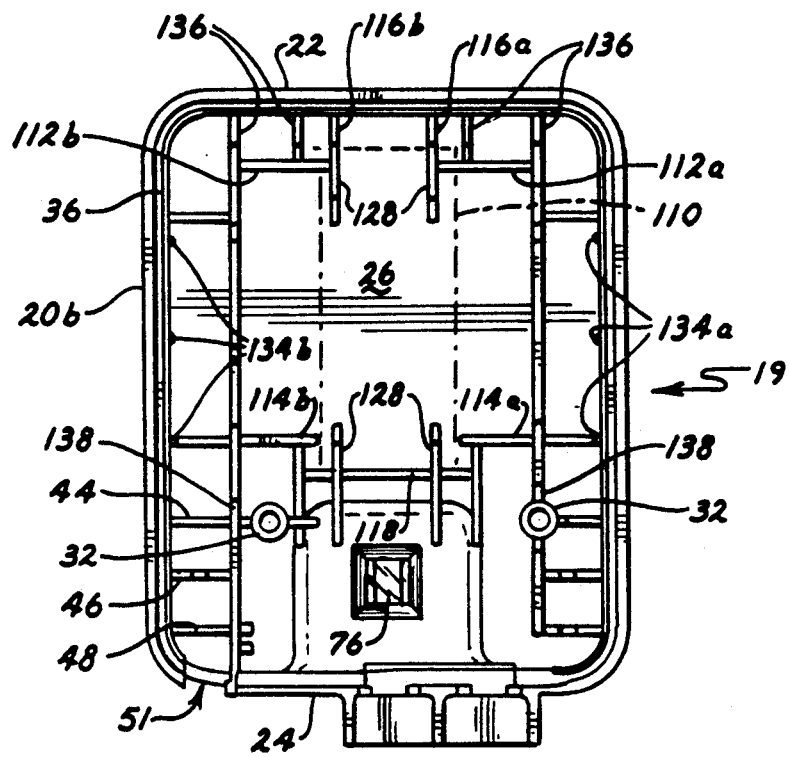
FIG. 4A is a rear elevational view of the base or front portion of the power boxes shown in FIGS. 1-3, with the electrical components removed therefrom.

Base 19 and cover 28 are connected together through the use of a pair of self tapping screws 30 (see FIG. 8) which fit loosely through rear wall 27 and a pair of cover bosses 31 (FIG. 4B) and thread into a pair of base bosses 32 (FIG. 4A). A substantially watertight fit is achieved between base 19 and cover 28 by means of a tapered lip 34 on the periphery of cover 28 wedging into a peripheral mating groove 36 in base 19 when base 19 and cover 28 are interconnected and secured using screws 30.

The preferred material for base 19 and cover 28 is Noryl plastic, although other materials are certainly contemplated.

It should be noted that the term "base" is generally used herein to connote the portion of the power box which contains most if not all of the electrical components, whereas the "cover" is the portion of the power box which engages and seals the base. The invention certainly contemplates that the "base" of the power box could be located toward the rear thereof with the cover being located at the front thereof. Alternatively, the base could be located toward the top or bottom of the power box with the cover toward the opposite end thereof.

Strain Relief 40

One aspect of the present invention is a 120 VAC cable strain relief 40. Strain relief 40 is formed by spaced elements in base 19 and cover 28 which mesh together or "interdigitate" when base 19 and cover 28 are assembled, thereby forming a tortuous path connection means for 120 VAC cable 15.

As shown in FIGS. 2, 3 and 4A, a strain relief structure 41 in base 19 includes a plurality of ribs which extend horizontally from left side wall 20b to a vertical strain relief side wall 42 extending upwardly from base bottom wall 24 and rearwardly from base front wall 26. More specifically, extending between walls 20b and 42 are a top rib 44, a middle rib 46 and a bottom rib 48. Ribs 44 and 48 are "straight" in the sense that their rearwardmost edge is substantially straight and parallel to front wall 26 of base 19. Middle rib 46 is V-shaped, with the apex of the "V" pointing toward front wall 26 of base 19. The outer and rearwardmost edges of the "V" of rib 46 are slightly forward of the imaginary vertical plane which contains the rearwardmost edges of straight ribs 44 and 48. Further, ribs 44, 46 and 48 are all horizontal and therefore parallel to each other.

A similar strain relief structure 43 is formed in cover 28. A vertical strain relief side wall 50 extends upwardly from cover bottom wall 25 and extends forwardly from cover rear wall 27. Spanning horizontally between cover left wall 21b and strain relief side wall 50 are a bottom V-rib 52 and a middle V-rib 54. A straight top rib 56 spans between the cover left side wall 21b and the top edge of the left hand cover boss 31. Ribs 52, 54 and 56 are all horizontal and vertically spaced in the same fashion as ribs 44, 46 and 48 in base 19.

Figure 5:
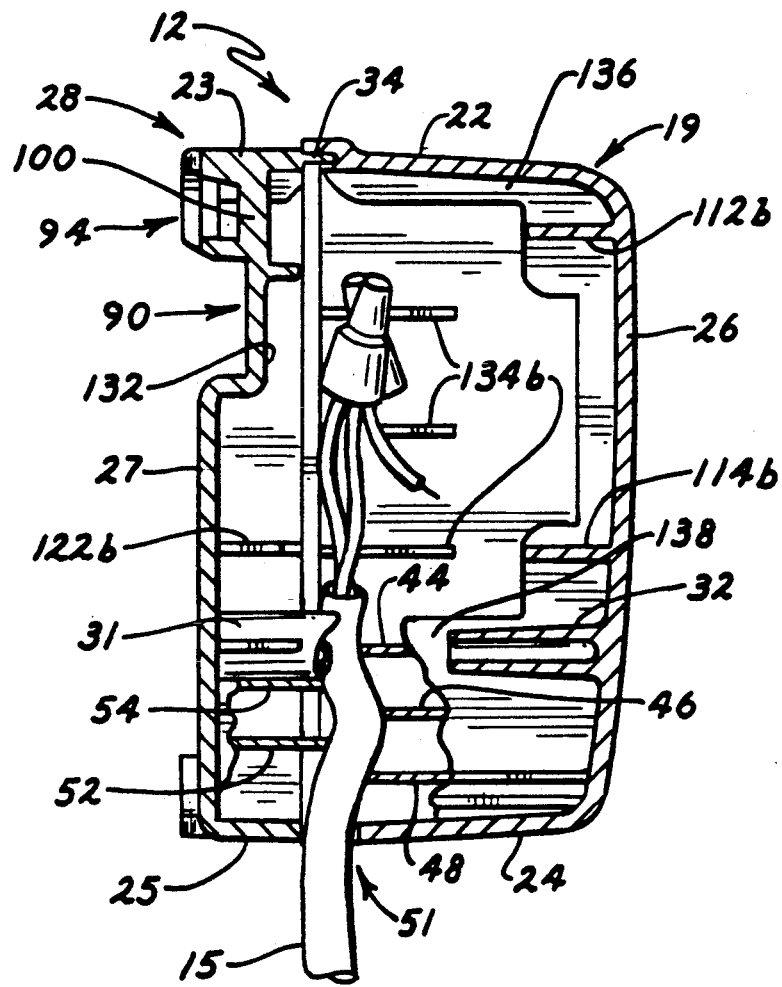
FIG. 5 is a vertical sectional view of the power boxes of FIGS. 1-3, showing a preferred embodiment of the tortuous path strain relief of the present invention engaging the 120 VAC cable.

As shown in the Drawing, the various ribs which form the strain relief structures 41 and 43 on the base 19 and cover 28, respectively, are vertically spaced. The preferred spacing depends on the rigidity and diameter of the particular 120 VAC cable being used. Applicants have found that a spacing of about 0.4 inch between adjacent ribs in a given structure 41 or 43 is preferable. This creates a spacing of about 0.2 inch between a given rib 44, 46 or 48 in structure 41 and an adjacent rib 56, 54 or 52 in structure 43 when base 19 and cover 28 are secured together. Rib 52 on cover 28 is spaced above cover bottom wall 25 such a distance that when cover 28 is attached to base 19 the ribs in the mating structures 41 and 43 mesh or interdigitate as shown in FIG. 5 to form the "tortuous path" strain relief 40 which solidly grips the 120 VAC cable 15.

During assembly of power box 12: 120 VAC cable 15 is positioned over base ribs 44, 46 and 48. Cover 28 is then placed on base 19 such that bosses 31 align with corresponding bosses 32 and such that peripheral lip 34 aligns with peripheral groove 36. Screws 30 are then inserted and tightened. As screws 30 are tightened, the opposing strain relief structures 41 and 43 in the base and cover approach each other and automatically grip the 120 VAC cable in tortuous path fashion. A notch 51, formed in bottom wall 24 of base 19, allows 120 VAC cable 15 to exit power box 12.

12 VAC Connections

Another aspect of the present invention relates to the manner in which the 12 VAC connections are made, both between (i) the secondary coil of the step down transformer and the PC board, and (ii) the PC board and the 12 VAC cable which runs from power box 12 to light fixtures 14. Referring to FIG. 2, a 120 VAC/12 VAC step down transformer 60 includes a primary coil 62 and a secondary coil 64. Wires 66a and 66b are connected to primary coil 62 and to the conductors within 120 VAC cable 15. A pair of smaller gage wires 68a and 68b are similarly attached to secondary coil 64 and include, at their free ends, a pair of spade lug receivers (female quick disconnects) 70a and 70b, respectively. As further discussed below, spade lug receivers 70a. 70b allow for connection of the secondary coil 64 to various electronic components located on a PC board 72, for conditioning of the 12 VAC power being conducted to the low voltage light fixtures 14 via 12 VAC cable 16.

PC board 72 is mounted within base assembly 18, toward the lower end thereof. PC board 72 includes a horizontal substrate 74 which can carry a variety of electronic components, depending on the features and functions of power box 12. Some power boxes, for example, turn on at dusk and off at dawn. In this case. PC board 72 could include a photoelectric cell which would "look" through a transparent window 76 located in front wall 26 of base 19: In that case, PC board 72 would include the electronic components necessary to support the photoelectric cell and to turn the 12 VAC power on and off accordingly. Typically, a solid state relay would be used for the latter purpose, power box 15 could also be of the type that turns on at dusk and off after a preselected period of time, e.g., four or eight hours. In this case. PC board 72 would not only carry a photoelectric cell and the electronics associated therewith, but it would also carry a solid state timer or timing circuit.

Thus the 12 VAC power produced in secondary coil 64 is needed on PC board 72 to drive the various components described above, and in particular so that a relay located on PC board 72 can selectively open or close the overall 12 VAC circuit as needed. The connection between wires 68 and PC board 72 is further discussed below.

Of course, there must also be means for connecting 12 VAC cable 16 to PC board 72, as well, prior art power boxes have used such things as terminal blocks to connect the 12 VAC cable 16 to the power box, but such devices are costly and somewhat difficult to use.

In the present invention the connections of PC board 72 to secondary coil 64 and to 12 VAC cable 16 are simultaneously accomplished through the use of a standard spade lug 77 and a pair of "double-L" shaped connectors 78a and 78b, as shown in FIGS. 2, 3, 6 and 7. "Double-L" connectors 78a and 78b include horizontal portions 80a and 80b, respectively, which are parallel to and lie in contact with the top surface of PC board substrate 74. Extending upwardly from horizontal portions 80a and 80b are "internal" spade lugs 82a and 82b; and extending downwardly through PC board substrate 74 and through apertures in base bottom wall 24 is a pair of "external" spade lugs 84a and 84b. Receiver 70a is connected to spade lug 77 and receiver 70b is connected to internal spade lug 82b. PC board 72 includes standard conductive paths for interconnecting the various components on same with standard spade lug 77 and double-L connectors 78a and 78b.

Figure 6:
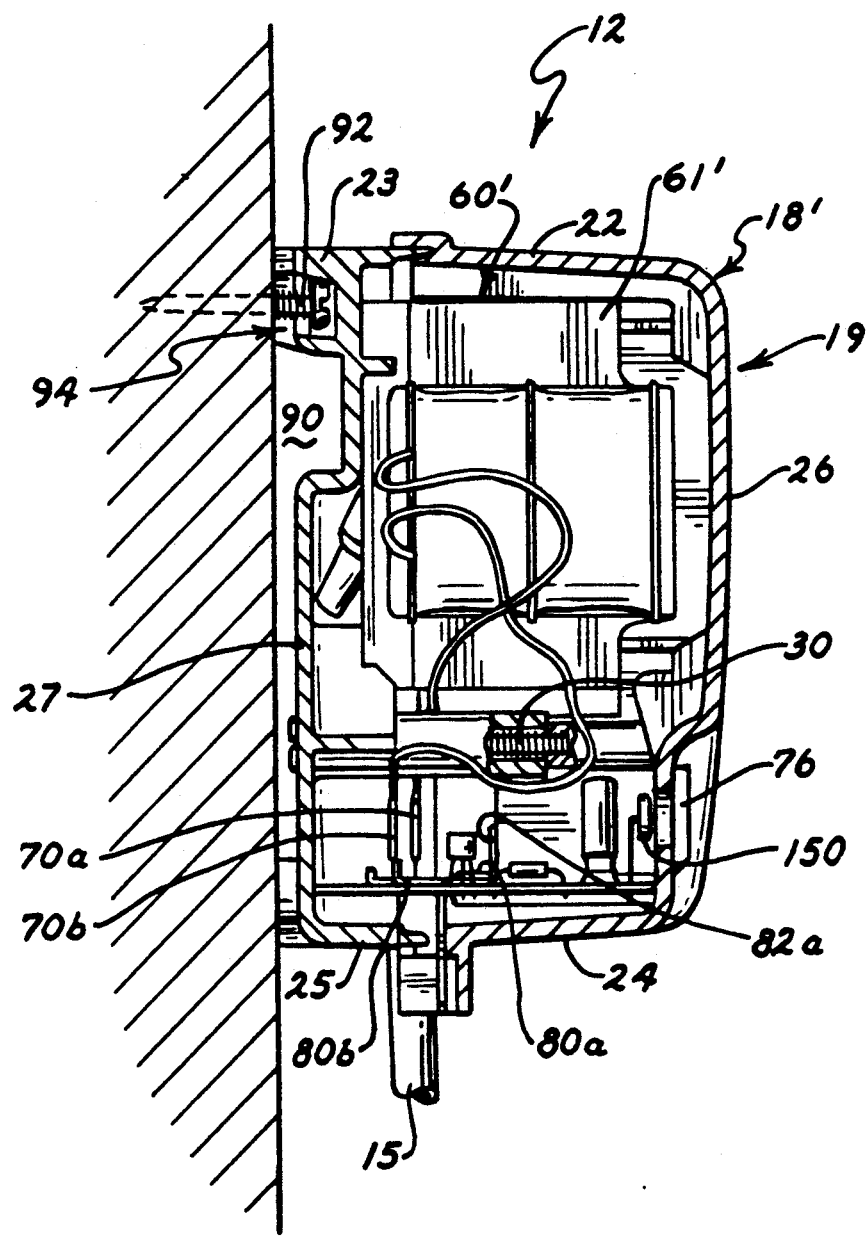
FIG. 6 is a side sectional view of the power box of FIG. 2 hanging on a mounting screw.

Referring to FIG. 6, although double-L connectors 78a and 78b are preferably identical to each other to reduce costs, in the preferred embodiment connector horizontal portion 80a extends forwardly from the imaginary vertical plane which contains external spade lugs 84, and horizontal portion 80b extends rearwardly from this imaginary plane. The internal spade lug 82a of connector 78a preferably bears flush against a relay or other component so that the assemblers do not inadvertently connect wire 68a or 68b to spade lug 82a. That is, spade lug 82a is present only because double-L connector 78a is the same as connector 78b to reduce costs; and neither wire 68a or 68b should be connected thereto.

PC board substrate 74 is supported and constrained in novel fashion, also. The edge of substrate 74 closest to 120 VAC cable 15 slides into a groove formed in one side of strain relief side wall 42. The opposite lateral side of substrate 74 is supported by external spade lugs 84a and 84b; external spade lugs 84 are notched on their edges and fit in fore-and-aft slots formed in the bottom wall 24 of base 19. Thus, substrate 74 is constrained against vertical movement. Horizontal movement of substrate 74 is prevented once cover 28 is secured to base 19, since the forward edge of substrate 74 bears against front wall 26 and the rearward edge of substrate 74 bears against rear wall 27.

Power Box Hanging System

Figure 4B:
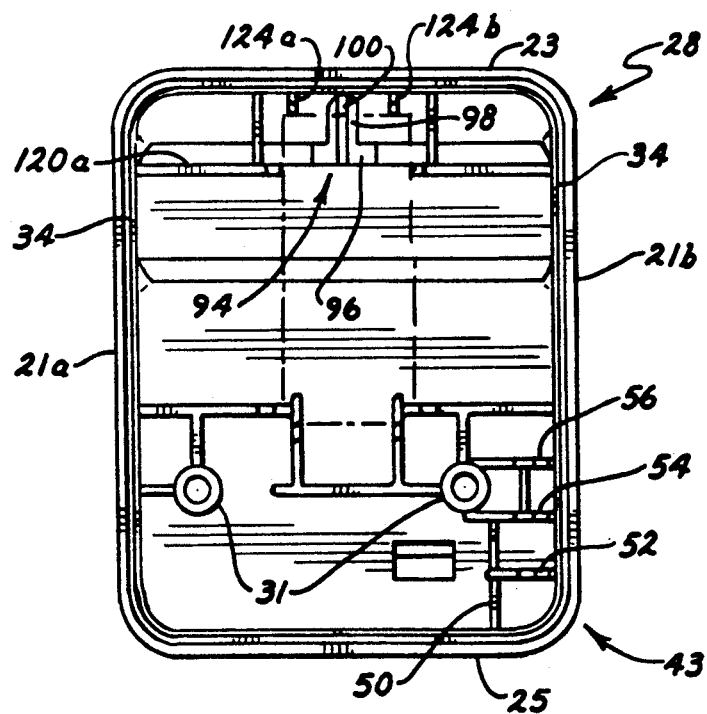
FIG. 4B is front elevational view of the rear cover of the power boxes shown in FIGS. 1-3.

Another aspect of the present invention is a novel hanging system for power box 12. Referring to FIGS. 4B: 6 and 8, the rear wall 27 of cover 28 forms a horizontal groove 90 across its entire width. The depth of groove 90 is preferably about 0.3 inch, whereas the height of groove 90 is preferably several times the diameter of the head of mounting screw 92 (see FIG. 6). Extending upwardly from the upper edge of groove 90, located approximately at the vertical centerline of power box 12, is a vertical slot 94 suitable for receiving mounting screw 92. More specifically slot 94 includes a relatively wide base 96 for receiving the head of mounting screw 92; and a narrower neck 98 for receiving the shank of mounting screw 92. A bar 100 extending vertically the length of slot 94, and located at the rear thereof roughly at the same depth as groove 90, is included for safety purposes, rendering it more difficult to insert a screwdriver or the like through slot 94 into the interior of power box 12.

To hang power box 12 on mounting screw 92, it is simply necessary to position power box 12 such that screw 92 is received by groove 90, and so contact is made between the top of the head of screw 92 and the upper edge of groove 90; and then sliding power box 12 either right or left, as necessary, until mounting screw 92 aligns with and falls into vertical slot 94 located approximately at the vertical centerline of power box 12.

Base and Cover Capable of Handling Various Electrical Components

As noted above, base 19 can accommodate a variety of electrical components. For example, base 19 can hold 36 watt transformer 60' (see FIG. 2) or a much larger 72 watt (or 98 watt) transformer 60" (see FIG. 3). As discussed above, 36 watt transformer 60' is positioned in base 19 such that rectangular transformer core 61' is aligned fore and aft. Referring to FIG. 4A, dashed line 110 shows the outline of core 61' and how it is restrained side-to-side and top-and-bottom by the various ribs extending rearwardly and downwardly, respectively, from front wall 26 and top wall 22 of base 19. Specifically, ribs 112a and 112b laterally confine the top of core 61'; ribs 114a and 114b laterally confine the bottom of core 61'; ribs 116a and 116b vertically confine top of core 61'; and rib 118 vertically confines the bottom of core 61'. Referring to FIG. 4Bring to FIG. 4B, corresponding ribs are formed in cover 28. That is, ribs 120a and 120b correspond to ribs 112a and 112b, respectively, and serve to laterally restrain the top of core 61'; ribs 122a and 122b correspond to ribs 114a and 114b, respectively; ribs 124a and 124b correspond to ribs 116a and 116b, respectively; and ribs 126a and 126b in cover 28 correspond, collectively, to rib 118 in base 19. Core 61' is restrained against forward and rearward motion by recessed coplanar rib surfaces 128 formed by base 19; and by recessed coplanar rib surfaces 130 and surface 132 formed by cover 28. Surface 132 is the front face of the element which constitutes the vertical wall defining, in part, groove 90 in rear wall 27 (see FIG. 8).

Figure 7:
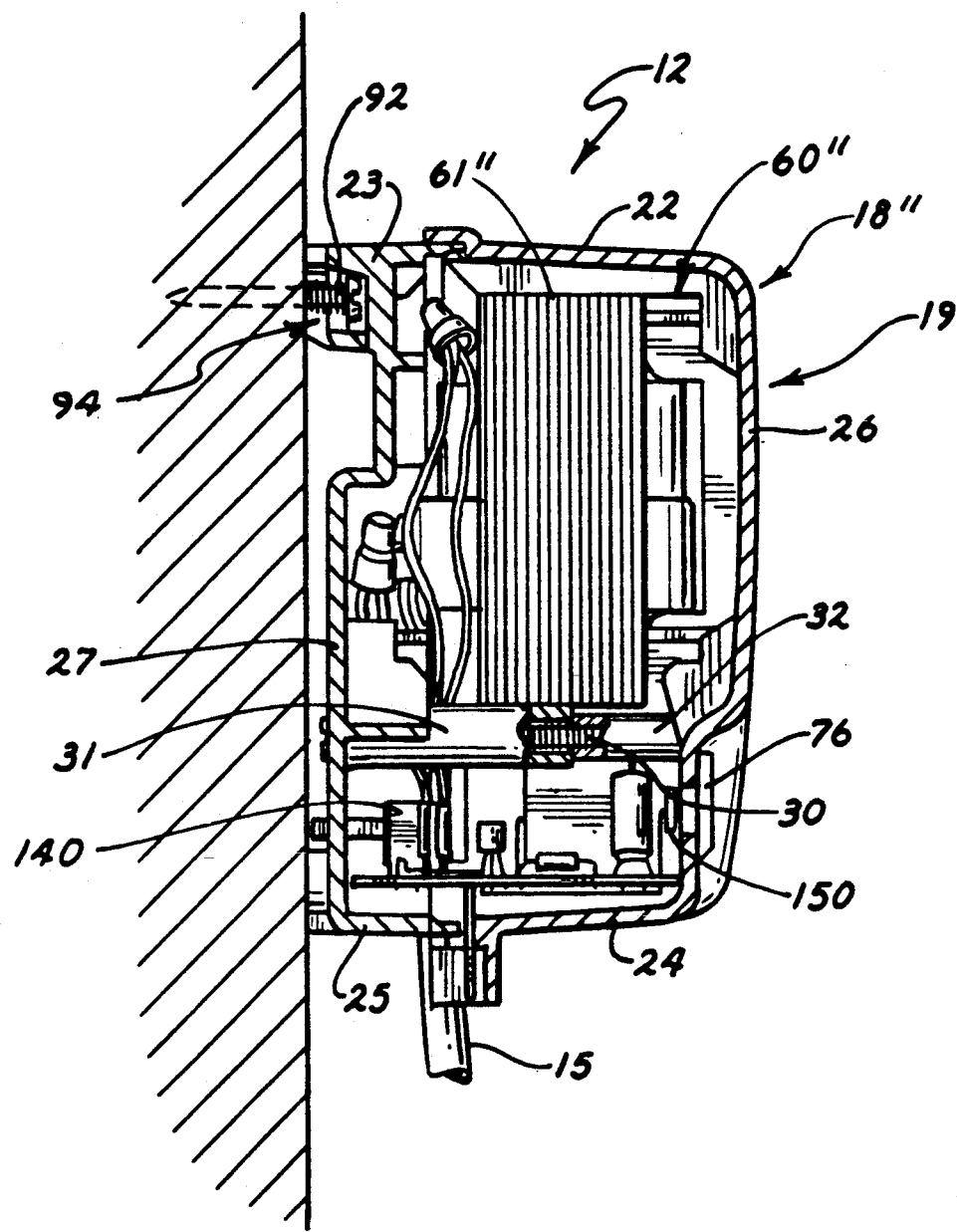
FIG. 7 is a side sectional view of the power box of FIG. 3, hanging on a mounting screw.

72 (or 98) watt transformer 60" is positioned such that rectangular core 61' is aligned laterally (see FIGS. 3 and 7). Core 61" is restrained on the sides by ribs 134a and 134b in base 19; on the top and bottom by ribs 116 and 136 in base 19 (top), and ribs 138 in base 19 (bottom); and on the front and rear by the rearmost edges of ribs 112 and 114 on base 19, and surface 132 on cover 28, respectively.

Figure 8:
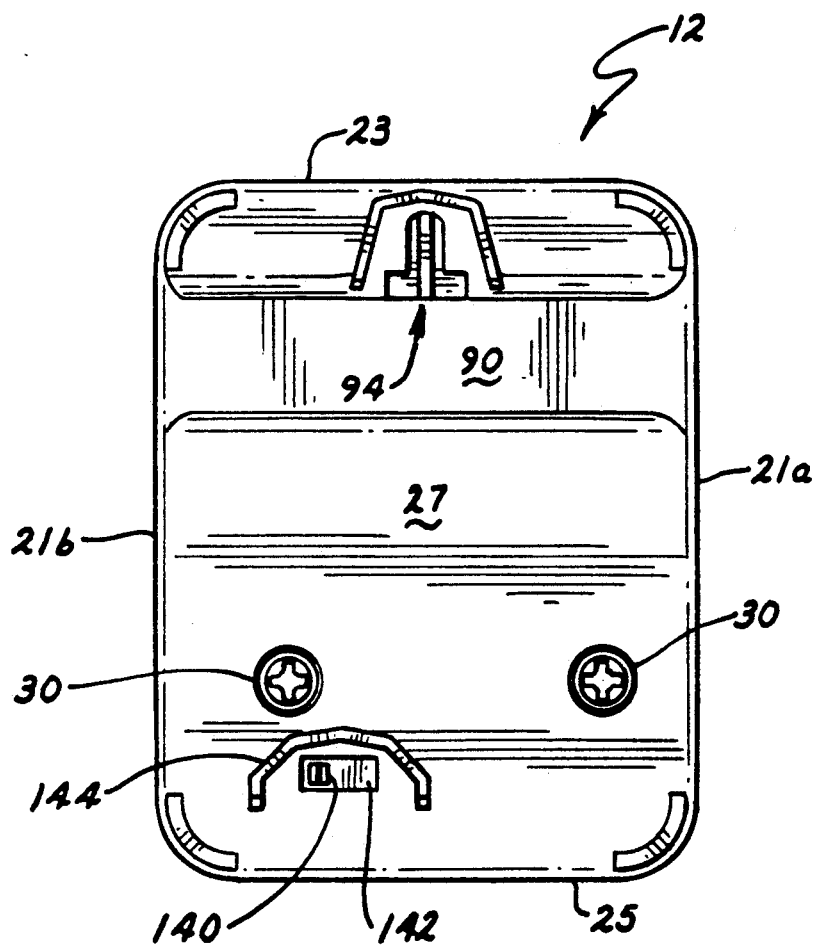
FIG. 8 is a rear elevational view of the power box of FIG. 2.
Figure 9:
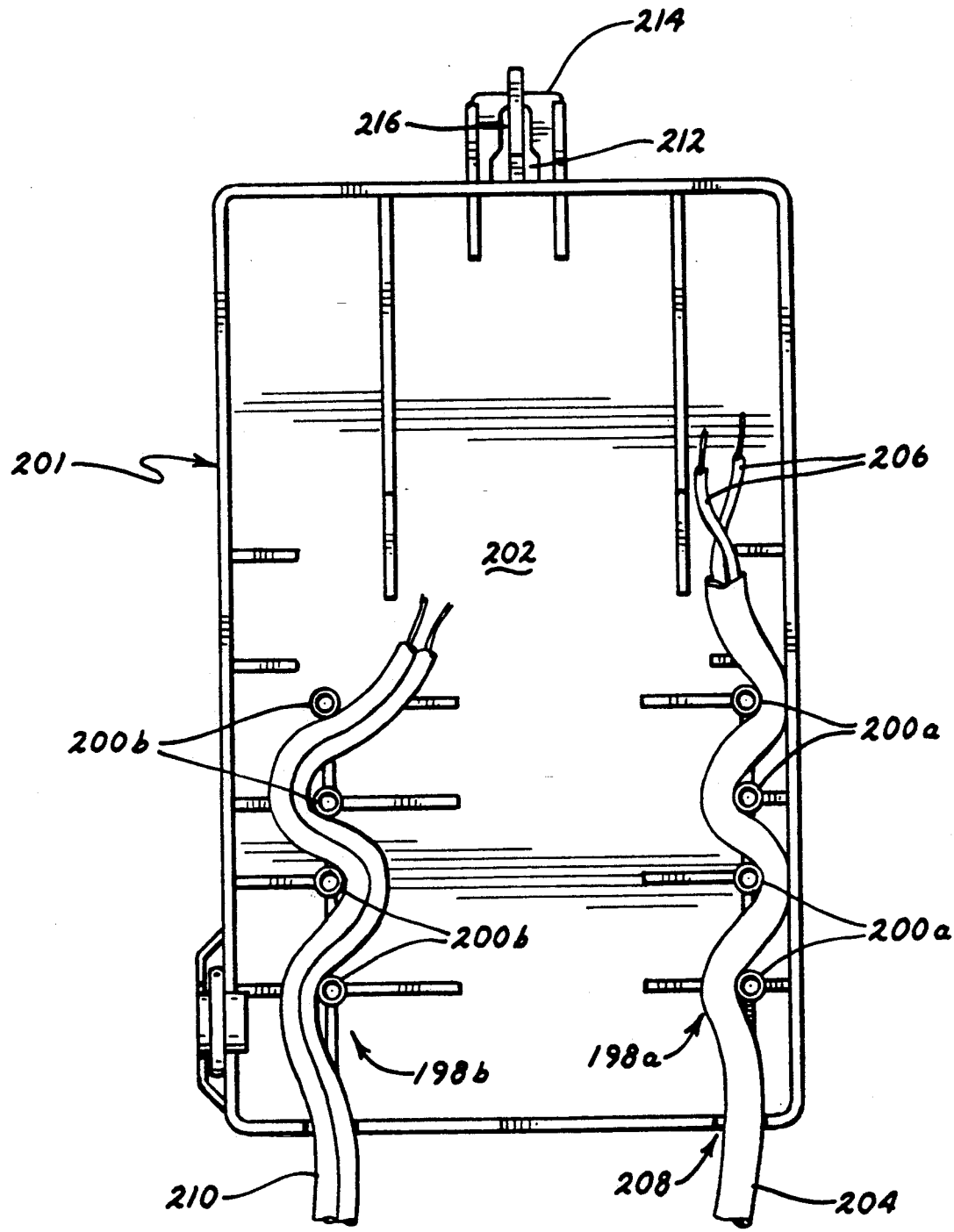
FIG. 9 is a front elevational view of the rear portion of a prior art low voltage power box, with the 12 VAC and 120 VAC cables in place but absent the other electrical components.
Figure 10:
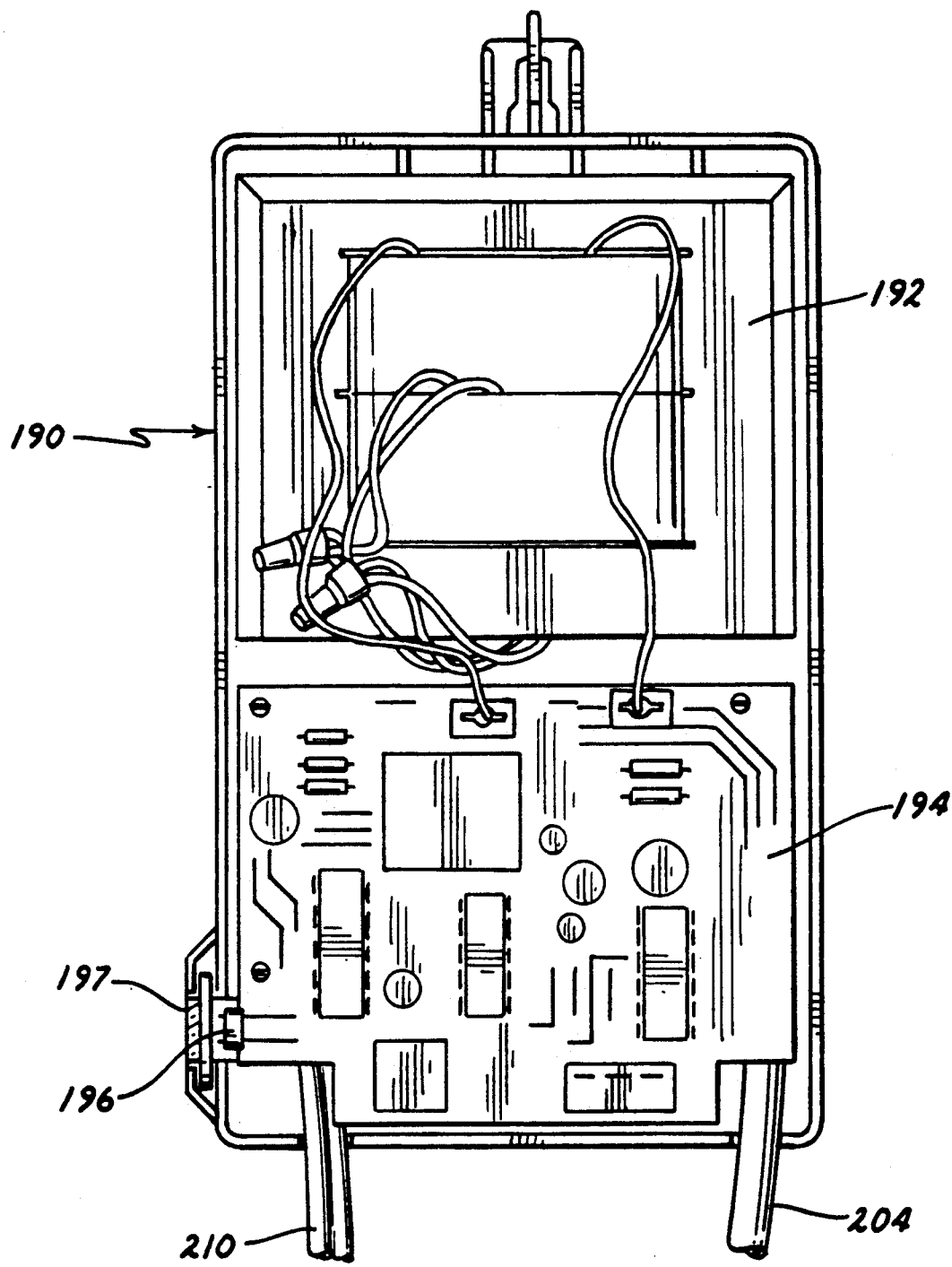
FIG. 10 is a front elevational view of the prior art power box of FIG. 9 with the electrical components thereof in position.
Figure 11:
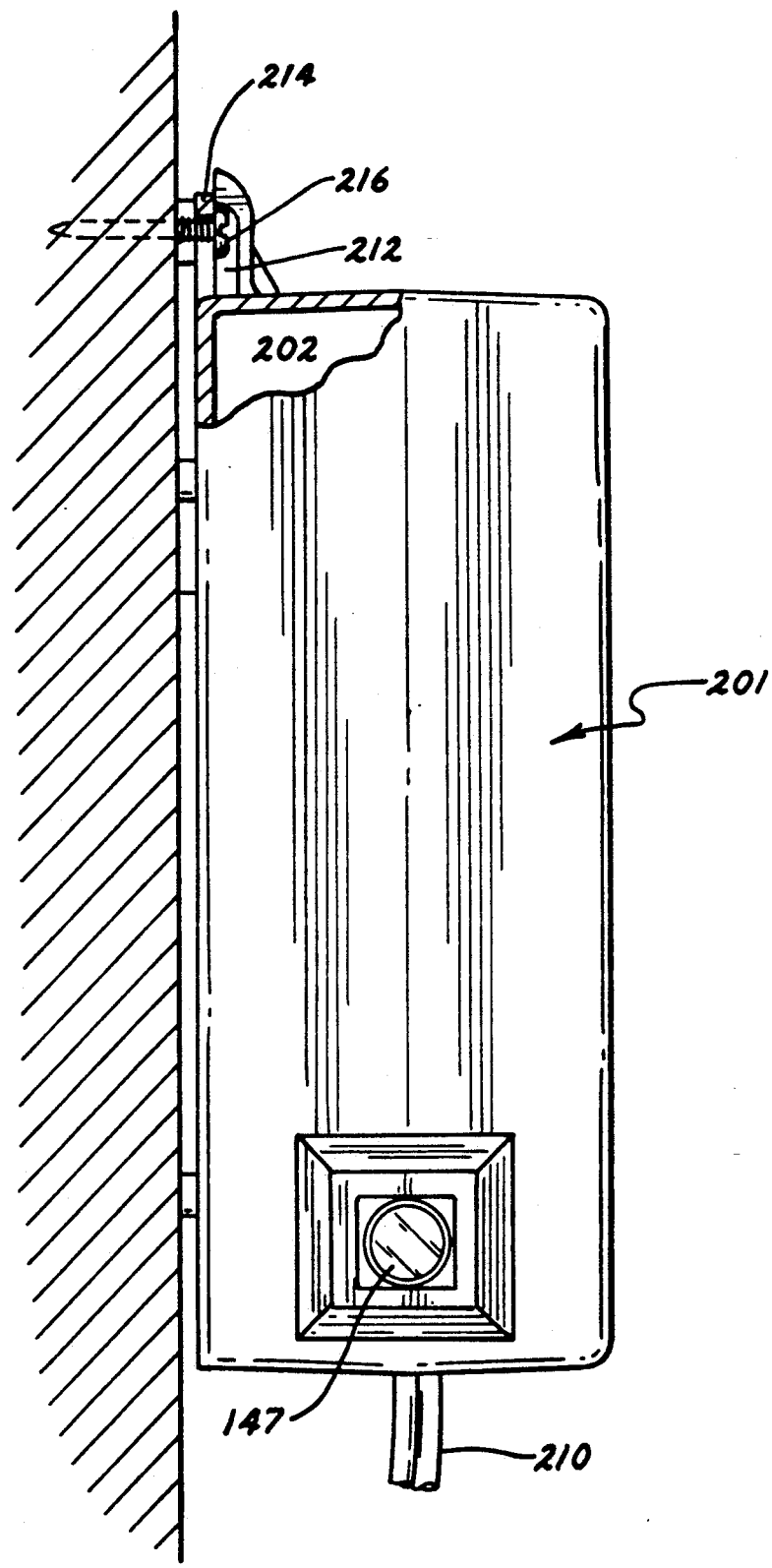
FIG. 11 is a side elevational view of the prior art power box of FIGS. 9 and 10, hanging on a mounting screw.

When a 4/8 hour switch 140 is included on PC board 72, as shown in FIGS. 3 and 7, it simply extends through a slot 142 (see FIG. 8). Slot 142 is small enough that it can remain open even when a 4/8 hour switch is not included. In specific, slot 142 is smaller than the UL "finger probe" and therefore can remain unfilled even when switch 140 is not used. A "rain roof" 144 (see FIG. 8) which extends rearwardly from rear wall 27 of cover 28 prevents water from entering slot 142.

An on/off switch (not shown) for a simple on/off power box can be included as well, simply by knocking out a thinned wall formed in the bottom wall 24 of base 19. Since the preferred on/of switch is considerably larger than the 4/8 hour switch 140, and in fact requires a fairly large slot, it is necessary to create a slot for same only when the manual switch is indeed being used.

Still another feature of power box 12 is that photoelectric cell 150, if indeed one is included on PC board 72, automatically aligns with window 76 in the front wall 26 of base 19, as shown in FIG. 6.

A preferred embodiment of the invention is described above. Those skilled in the art will recognize that many embodiments are possible within the scope of the invention. Variations and modifications of the various parts and assemblies can certainly be made and still fall within the scope of the invention. Thus, the invention is limited only to the apparatus and method recited in the following claims, and equivalents thereof.

We claim:

1. A power box assembly for a low voltage lighting system, comprising:
   (a) a power box having a base and a cover for connection thereto, wherein the base comprises a bottom wall;
   (b) a 120 VAC/12 VAC step down transformer mounted on the power box with a primary coil and a secondary coil having at least one output wire connected thereto which terminates with a transformer spade lug receiver;
   (c) a 120 VAC power cord connected to the primary coil;
   (d) a 12 VAC cable having a pair of low voltage cable spade lug receivers at one end thereof;
   (e) a PC board having a substrate horizontally mounted within the power box; and
   (f) a pair of low voltage connectors, each having a horizontal portion and a pair of horizontally spaced and vertically staggered vertical portions connected thereto, wherein:
      i. the horizontal portion of each low voltage connector is parallel to and lies in contact with the PC board substrate;
      ii. one of the vertical connector portions of each low voltage connector extends downwardly from the horizontal portion thereof through the bottom wall of the power box base; and
      iii. the other vertical connector portion of each low voltage connector extends upwardly from the horizontal portion thereof, wherein one of the upwardly extending vertical connector portions forms a spade lug for connection to the transformer spade lug receiver and the downwardly extending connecting portions form spade lugs for connection to the low voltage cable spade lug receivers.

2. A power box assembly for a low voltage lighting system, comprising:
   (a) a power box comprising a wall;
   (b) a step down transformer mounted on the power box with a primary coil and a secondary coil having at least one output wire connected thereto which terminates with a transformer spade lug receiver;
   (c) a 120 VAC power cord connected to the primary coil;
   (d) a low voltage cable having a pair of low voltage cable spade lug receivers at one end thereof;
   (e) a PC board having a substrate mounted substantially parallel to the power box wall within the power box; and
   (f) a pair of low voltage connectors, each having a first portion substantially parallel to the power box wall and a pair of spaced and staggered second portions substantially perpendicular to the first portion and connected thereto, wherein:
      (i) the first portion of each low voltage connector is parallel to and lies in contact with the PC board substrate;
      (ii) one of the second connector portions of each low voltage connector extends in a first direction through the power box wall; and
      (iii) the other second connector portion of each low voltage connector extends in a second direction opposite from the first direction, wherein one of the second connector portions extending in the second direction forms a spade lug for connection to the transformer spade lug receiver and the connecting portions extending in the first direction form spade lugs for connection to the low voltage cable spade lug receivers.

* * * * *